July 7, 1953  G. A. TINNERMAN  2,644,502
FASTENING DEVICE
Original Filed May 29, 1946
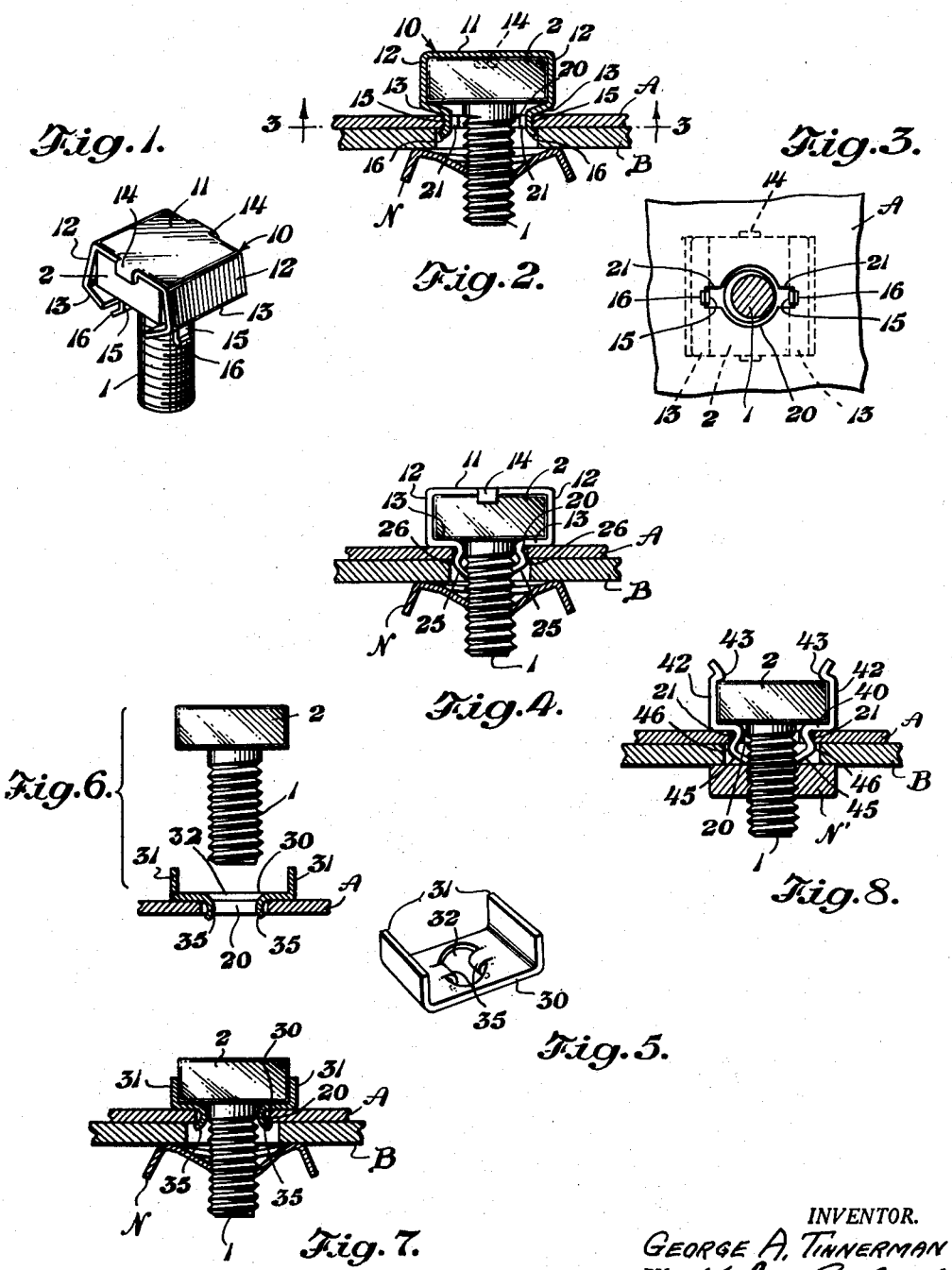
INVENTOR.
GEORGE A. TINNERMAN
BY H. G. Lombard
ATTORNEY

Patented July 7, 1953

2,644,502

UNITED STATES PATENT OFFICE 2,644,502

FASTENING DEVICE

George A. Tinnerman, Cleveland, Ohio, assignor to Tinnerman Products, Inc., Cleveland, Ohio, a corporation of Ohio Application October 11, 1951, Serial No. 250,828, now Patent No. 2,636,533, dated April 28, 1953, which is a division of application Serial No. 672,947, May 29, 1946. Divided and this application February 19, 1953, Serial No. 337,737

8 Claims. (Cl. 151—41.75)

This invention relates in general to bolt fastened installations and deals, more particularly, with improvements in bolt holding devices for attaching standard bolts, screws, rivets, and similar studs in fastening position in an assembly prior to the application of a cooperating nut device thereto for securing the parts of the assembly.

This application is a division of copending application Serial Number 250,828, filed October 11, 1951 and issued April 28, 1953 as United States Patent Number 2,636,533, and which in turn is a division of application Serial Number 672,947, filed May 29, 1946.

In many assemblies, it is necessary or desirable to use a standard nut and bolt fastening means but it is usually a difficult problem, especially in blind locations, for the operator to hold the bolt in place as the nut is applied, or otherwise, to maintain the bolt against rotation during the final tightening of the nut therewith. In such an assembly in which the rearward side of a part is not conveniently or readily accessible for holding a bolt in fastening position prior to the application of the nut, it has been the practice to resort to various forms of cage devices requiring a welding or riveting operation for attaching the same in providing means for holding the bolt in fastening position. Such welding or riveting operation involves considerably increased costs in manufacture which often make the use of this type of bolt holder prohibitive in many installations requiring a cheap and inexpensive fastening means, while they are otherwise objectionable by reason of the inordinate amount of time required in the installation thereof in an assembly.

A primary object of this invention, therefore, is to provide an improved form of bolt holder or retainer which is relatively simple and inexpensive to manufacture and includes in its construction a highly practical form of attaching means designed for quick and easy clip or snap fastening application to attach the bolt in fastening position in an installation in a minimum of time and effort.

A further, more specific object of the invention is for the provision of various forms of bolt holders for conventional or standard bolts comprising a sheet metal device having an improved attaching means designed for clip or snap fastening attachment to a part to retain the bolt against accidental removal or displacement while otherwise holding the bolt against turning as the associated nut is threaded thereon and tightened.

Another object of the invention is to provide various forms of bolt holders of this character embodying integral clip or snap fastening means providing a positive nonrotatable attachment of a bolt in an opening in a part in a manner to prevent turning of the bolt as a nut is tightened thereon, and to prevent loosening of the bolt from tightened fastening position incidental to vibration, strain, and jarring effects in a completed installation.

Further objects and advantages, and other new and useful features in the construction, arrangement and general combination of parts of the invention will be readily apparent to those skilled in the art as the following description proceeds with reference to the accompanying drawings, for purposes of illustration but not of limitation, in which like reference characters designate like parts throughout the same, and in which:

Fig. 1 is a perspective view showing an improved bolt retainer in accordance with the invention as assembled with a bolt preparatory to attachment thereof in an installation;

Fig. 2 is a sectional view showing the bolt and retainer of Fig. 1 as attached to a panel, or the like, with an associated part secured thereto by a cooperating nut in a completed fastening installation;

Fig. 3 is a sectional view of Fig. 2 taken along line 3—3, looking in the direction of the arrows;

Fig. 4 is a sectional view similar to Fig. 2 showing a further form of bolt holder in accordance with the invention;

Fig. 5 is a perspective view showing the general construction of another form of bolt retainer;

Fig. 6 shows the bolt holder of Fig. 5 as initially applied to the bolt opening in a part with the bolt about to be applied to locked relation with the retainer in the attached position thereof in the bolt opening;

Fig. 7 is a sectional view showing the retainer and bolt of Fig. 6 in locked relation in the attached position thereof in the bolt opening in a supporting part with an associated part secured thereto by a cooperating nut; and, Fig. 8 is sectional view similar to Fig. 7 showing another form of bolt holder in accordance with the invention.

Referring now, more particularly, to the drawings, Fig. 1 shows a bolt holder 10 which is constructed from a sheet metal section of a size and configuration determined by the shape and size of the bolt head with which it is to be used. The bolt holder may be readily designed for use with any type of bolt head, and in the present example it is shown employed with a standard bolt 1 having a square head 2. Any suitable sheet metal may be employed for making the bolt holder preferably that of a spring metal nature such as spring steel or cold rolled steel having spring like characteristics.

The sheet metal section forming the bolt holder 10 is bent to define a central cap portion 11 having depending side flanges 12 and inwardly bent flanges 13 conforming generally to the contour of the bolt head. Preferably, the side flanges 12 are bent to flare slightly outwardly from the adjacent side faces of the bolt head while the flanges 13 extend downwardly in inclined relation to the underside thereof in the normal untensioned relation of the bolt holder. Lugs 14 may be included on the cap portion of the bolt holder for engaging the bolt head 2 in cooperation with the side flanges 12. The ends of the flanges 13 are provided with fingers 15, or the like, which are designed for resilient engagement with opposing edge portions of a panel opening by substantial snap fastening action. Preferably the extremities of the fingers 15 are so formed as to define outwardly bent tongues or hook elements 16, or the like.

The bolt holder, thus provided, is assembled onto the bolt head 2 and the outwardly flaring side flanges 12 compressed against the faces of the bolt head to bring the fingers 15 toward each other as closely as possible. The bolt shank is then inserted through the opening 20 in the panel A and in the compressed relation of the side flanges 12 the fingers 15 are so spaced as to pass into the opening or may be flexed as necessary to pass therethrough. The side flanges 12 of the bolt holder are then released from their compressed relation and in attempting to assume their initial outwardly flared relation, force the fingers 15 to spread apart and thereby frictionally and grippingly engage the adjacent edges of the panel opening to retain the bolt in attached position in said opening. In this relation, the hook elements 16 on the extremities of the fingers seat against the marginal surfaces adjacent the panel opening to provide a positive attachment of the bolt holder which prevents any reverse axial movement of the bolt toward removal from attached position in the panel opening. At the same time, the resilient nature of the fingers 15 in frictional and gripping engagement with the edges of the panel opening, as aforesaid, is such as to prevent turning of the bolt as the associated nut N is threaded thereon and rotated to tightened fastening position in securing the panel A to a cooperating part B. The nut N shown is a self-locking type of spring nut, but it is to be understood that the invention fully contemplates the use of any other suitable form of threaded nut, lock nut, or the like.

In a blind fastening installation, for example, or other assembly wherein it is not possible or convenient to apply a tool to the bolt head to prevent turning thereof as the nut is rotated and tightened, a positive, nonrotatable attachment of the bolt against such turning is frequently necessary or desirable. To this end, the panel opening 20, is provided with one or more lateral recesses or slots 21 adapted to receive the fingers 15 as shown in Figs. 2 and 3. The provision of the panel opening with such lateral slots 21 is accomplished at little or no added cost in the same punching operation by which the necessary bolt passage 20 would be provided in any event. The slots 21 define abutments against which the edges of the fingers 15 engage to prevent any relative rotative movement of the nut holder which in turn, positively retains the bolt against turning as the nut is threaded thereon and tightened by virtue of the flanges 12 and lugs 14 in engagement with the side faces of the bolt head. The attachment of the bolt holder in a panel opening having such lateral recesses or slots 21 therefore provides an important advantage in many instances where the nut must be drawn up tight and the bolt head is not conveniently or readily accessible for the use of a tool to prevent turning of the bolt with the nut as the nut is tightened.

Fig. 4 shows another form of bolt holder which is similar to that described with reference to Figs. 1–3, inclusive, except for the construction of the fingers 25 for retaining the bolt holder in attached position. This form of bolt holder is designed for ready attachment in a panel opening 20 provided either with or without one or more of the lateral slots 21 shown in Figs. 2 and 3. In any event, the fingers 25 are so formed as to define shoulders 26 adapted for snap fastening engagement with adjacent edges of the panel opening 20 or adjacent edges of the lateral slots 21, Fig. 3, as the case may be. Preferably the extremities of the fingers are bent inwardly into engagement with the bolt shank to stiffen the fingers in operative relation and thereby increase the holding ability of the shoulders 26 in snap fastened engagement with the adjacent edges of the panel opening.

Figs. 5–7, inclusive, show a further embodiment of the invention in which the bolt holder is provided as shown in Fig. 5 to comprise a central body portion 30 and upturned flanges 31 which are so spaced as to engage opposing faces of the bolt head. A passage 32 for the bolt shank is provided in the body of the bolt holder along with one or more fingers 35, which are struck from the metal originally in the area of the bolt passage 32 and bent downwardly on either side to define means for attaching the bolt holder in the panel opening 20. The fingers 35 preferably are bent into the form of arcuate hooks extending outwardly in opposed relation and having their extremities spaced apart a distance equal to or slightly less than the size of the panel opening 20 to pass therethrough or to be flexed as necessary to seat snugly therein as shown in Fig. 6. The space between the fingers 35 is slightly less than the diameter of the bolt, and accordingly, when the bolt is forced through the passage 32 in the bolt holder, the bolt engages the inner surface of the fingers 35 to spread them outwardly into gripping engagement with opposing edge portions of the panel opening with the extremities of the fingers engaging the corners or panel surfaces adjacent thereto as shown in Fig. 7. The bolt is thus forced or driven if necessary to its attached position shown in Fig. 7, in which relation opposing faces of the bolt head are snugly engaged by the flanges 31 of the bolt holder. Inasmuch as the bolt holder is nonrotatably secured in the panel opening by the fingers 35, the bolt likewise is nonrotatably retained in the panel opening by the flanges 31, while the pronounced frictional engagement of said fingers with the bolt shank prevents any reverse axial movement or displacement of the bolt toward removal from attached position in the panel opening.

Fig. 8 shows another embodiment of the invention in which the bolt holder has the general formation of that illustrated in Fig. 5 comprising a central body 40 provided with upturned flanges 42 for engaging opposing faces of the bolt head and which include bent portions on their extremities defining outwardly flared tongues leading to detents or projections 43 adapted for snap fastening engagement with the top of the bolt head. The body of the bolt holder is provided with a bolt passage along with fingers 45 which are struck from the metal originally in the area of the bolt passage to define means for attaching the bolt holder in the panel opening 20. The fingers 45 are so formed as to define cam shoulders 46, or the like, adapted for snap fastening engagement with adjacent edge portions of the panel opening 20 or adjacent edges of the lateral slots 21 as and for the purposes described with reference to the embodiments of Figs. 1-3, inclusive, and Fig. 4. Also, similarly to the embodiment of Fig. 4, the extremities of the fingers 45 preferably are bent inwardly into engagement with the bolt shank to stiffen the same in operative relation and thereby increase the holding qualities of the shoulders 46 in the panel opening.

In this form of the invention, the bolt is assembled with the bolt holder either before the bolt is applied to the panel opening similarly to the embodiment of Figs. 1-4, inclusive, or after the bolt holder is first applied to the panel opening as described with reference to the embodiment of Fig. 7. Thus, the bolt and bolt holder may be preassembled simply by passing the bolt shank through the passage in the bolt holder and snapping the sides of the bolt head past the detents 43 into engagement with the side flanges 42. Accordingly, the detents 43 engage the top of the bolt head while the extremities of the fingers 45 engage the bolt shank to retain the bolt in assembled relation with the bolt holder. The assembly is then attached in the panel opening by the snap fastening engagement provided by the shoulders 46, aforesaid. Similarly, the bolt holder may first be attached in the panel opening and the bolt then applied to assembled relation therewith, with the side flanges 42 engaging opposing faces of the bolt head, the detents 43 engaging the top of the bolt head and the extremities of the fingers 45 engaging the bolt shank to lock the bolt in the panel opening against rotative as well as reverse axial movement. Securing of the part B to the support A is then easily accomplished entirely from one side of the installation simply by threading the nut N' onto the bolt shank without need for holding the bolt against turning as the nut is rotated and tightened. The nut N' represents a conventional, standard threaded nut which may be used, if desired, in any of the other embodiments of the invention; likewise, a spring nut such as shown employed in Fig. 2 may be used in lieu of the threaded nut N' shown in Fig. 8.

It will be appreciated that in any form of the invention the side flanges of the holder or retainer, in engaging the periphery of a bolt head, or equivalent rotary clamping member such as a nut member on a threaded stud defining a bolt fastener, serve as a coupling means with the attaching fingers of the retainer to secure the bolt or rotary clamping member in a panel opening against rotative movement as well as axial displacement. Additionally, it will be noted that in each form of the invention the holder or retainer includes a portion serving as a bearing washer under the head or clamping surface of the bolt or other rotary clamping member, thereby dispensing with need for such washers and also lock washers which makes for considerable savings not only in the cost of these devices, but also in the amount of assembly time and cost of labor involved in assembling operations.

While the invention has been described in detail with specific examples, such examples are intended as illustrations only, since it will be apparent to those skilled in the art that other modifications in the construction, arrangement and general combination of parts may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. A fastener unit comprising a fastener part having a barrel and a laterally disposed flange at one end thereof, a retainer formed with an apertured base portion surrounding said barrel and including portions securing said base portion to the flange of said fastener part, and support-engaging fingers integral with said base portion and disposed radially of said barrel of the fastener part, said fingers having their outer ends disposed adjacent said barrel and intermediate portions radially spaced from said barrel providing snap fastener means for engaging the walls of an aperture in a support.

2. A fastener unit in accordance with claim 1 wherein said retainer formed with an apertured base portion surrounding said barrel comprises a piece of sheet metal defining said base portion and having its ends extending upwardly from said base portion to provide said portions securing said base portion to the flange of said fastener part.

3. A fastener unit in accordance with claim 1 wherein said retainer formed with an apertured base portion surrounding said barrel comprises a piece of sheet metal defining said base portion and having its ends extending upwardly from said base portion to provide said portions securing said base portion to the flange of said fastener part, said upwardly extending ends being provided with inwardly extending projections in engagement with said flange of said fastener part.

4. A fastener unit in accordance with claim 1 wherein said retainer formed with an apertured base portion surrounding said barrel comprises a piece of sheet metal defining said base portion and having its ends extending upwardly from said base portion to provide said portions securing said base portion to the flange of said fastener part, and said fingers projecting downwardly from said base portion in the opposite direction from said upwardly extending ends.

5. A fastener unit in accordance with claim 1 wherein said retainer formed with an apertured base portion surrounding said barrel comprises a piece of sheet metal defining said base portion and having its ends extending upwardly from said base portion to provide said portions securing said base portion to the flange of said fastener part, said upwardly extending ends being provided with inwardly extending projections in engagement with said flange of said fastener part, and said fingers projecting downwardly from said base portion in the opposite direction from said upwardly extending ends.

6. A fastener unit in accordance with claim 1 wherein said fastener part is a bolt and the head of said bolt is said laterally disposed flange, and said retainer formed with an apertured base portion comprises a piece of sheet metal defining said base portion and having its ends extending upwardly from said base portion to provide said portions securing said base portion to the head of said bolt.

7. A fastener unit in accordance with claim 1 wherein said fastener part is a bolt and the head of said bolt is said laterally disposed flange, and said retainer formed with an apertured base portion comprises a piece of sheet metal defining said base portion and having its ends extending upwardly from said base portion to provide said portions securing said base portion to the head of said bolt, said fingers projecting downwardly from said base portion along the shank of said bolt in the opposite direction from said upwardly extending ends.

8. A fastener unit in accordance with claim 1 wherein said fastener part is a bolt and the head of said bolt is said laterally disposed flange, and said retainer formed with an apertured base portion comprises a piece of sheet metal defining said base portion and having its ends extending upwardly from said base portion and provided with inwardly extending projections in engagement with the head of said bolt, and said fingers projecting downwardly from said base portion along the shank of said bolt in the opposite direction from said upwardly extending ends.

GEORGE A. TINNERMAN.

References Cited in the file of this patent
UNITED STATES PATENTS

| Number | Name | Date |
|---|---|---|
| 1,725,883 | Recker | Aug. 27, 1929 |
| 2,096,387 | Tinnerman | Oct. 19, 1937 |
| 2,246,722 | Del Camp | June 24, 1941 |
| 2,581,312 | Tinnerman | Jan. 1, 1952 |